UNITED STATES PATENT OFFICE.

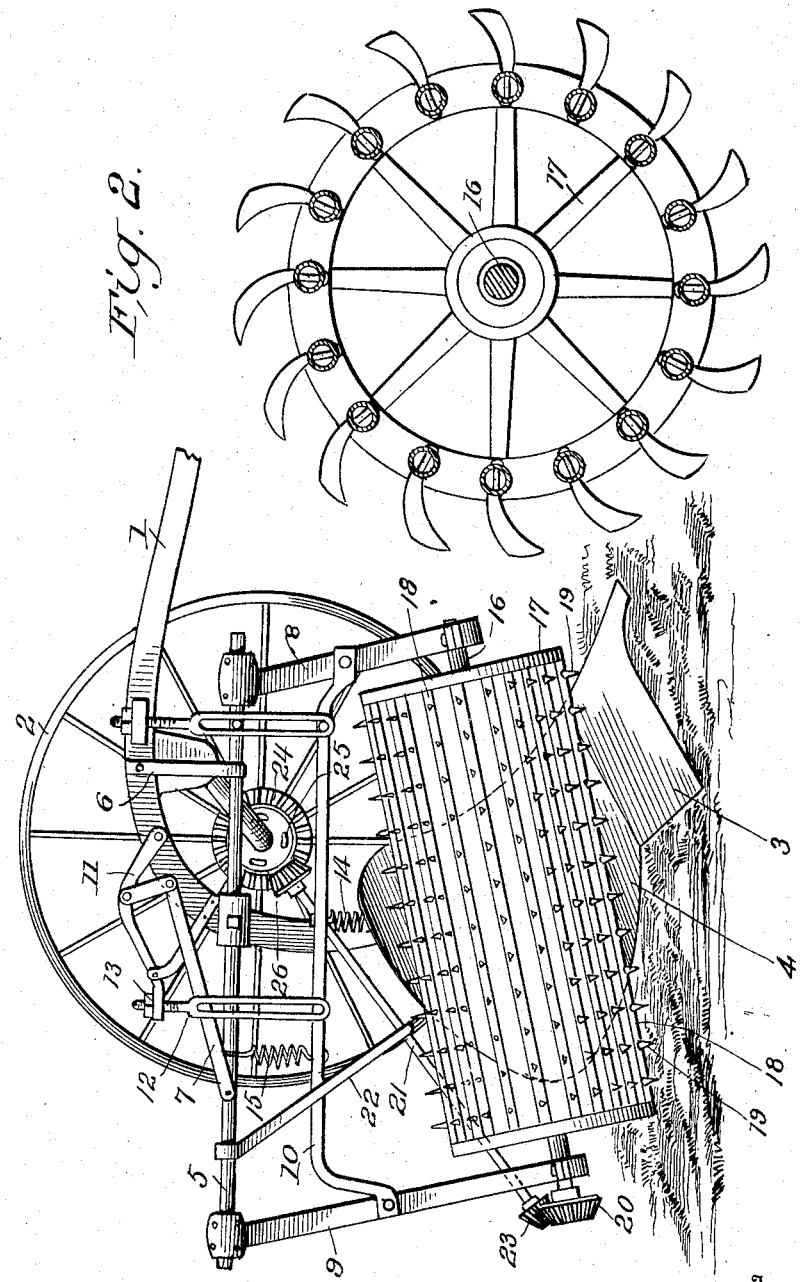

EUGENE R. EAGAN, OF HUBBARD, IOWA.

SOIL-PULVERIZER.

1,015,303.  Specification of Letters Patent.  Patented Jan. 23, 1912.

Application filed April 29, 1911. Serial No. 624,487.

*To all whom it may concern:*

Be it known that I, EUGENE R. EAGAN, citizen of the United States, residing at Hubbard, in the county of Hardin and State of Iowa, have invented certain new and useful Improvements in Soil-Pulverizers, of which the following is a specification.

This invention has relation to soil pulverizers adapted to be applied to breaking plows, and has for its object to provide a rotary soil engaging member which is operated from one of the supporting wheels of the plow for the purpose of operating upon the upturned side of the furrow slice at the time that the said slice is being turned.

With this object in view, the attachment includes a bar adapted to be applied to the beam of a breaking plow and upon which is pivotally mounted arms. Means is provided for resiliently holding the free end portions of said arms in lowered positions, and a soil engaging member is journaled at the free end portions of the arms and is located just beyond the outer surface of the moldboard of the plow bottom. Means is provided for rotating the said soil engaging member from the landside wheel of the plow structure.

For a full understanding of the invention reference is to be had to the following description and accompanying drawings, in which:

Figure 1 is a perspective view of the pulverizer attached to a plow; and Fig. 2 is an end view of the soil engaging member of the pulverizer.

Corresponding and like parts are referred to in the following description and indicated in all the views of the accompanying drawings by the same reference characters.

The plow to which the attachment is adapted to be applied is of the usual sulky type and includes a beam 1 to which it attached a landside wheel 2 and which carries a bottom 3 having the usual moldboard 4. The attachment includes a bar 5 which is clamped or otherwise secured to the beam 1 at the rear down-turned portion thereof and which is sustained in its position by means of braces 6 and 7. Arms 8 and 9 are pivoted to the ends of the bar 5, the arm 9 being at the rear end of the said bar, and the arm 8 at the front end, the arm 9 being longer than the arm 8. A brace rod 10 connects the intermediate portions of the arms 8 and 9 together, and brackets 11 are mounted upon the beam 1 and carry slotted bars 12 which receive the intermediate portions of the said rod 10. The bars 12 are adjustably mounted with relation to the brackets 11, and, as shown, the means for adjustment consists of nuts 13 which are screw threaded upon the upper ends of the said bars and which bear against the upper surfaces of the brackets 11. Normally the rod 10 rests at the lower ends of the slots in the bars 12. A spring 14 is connected at one end with the rod 10 and at its other end with the beam 1, and is under tension with a tendency to hold the rod 10 in the lower ends of the slots provided in the bars 12. A weaker spring 15 is connected at its lower end with the rod 10 and at its upper end with the bar 5, and serves as means for preventing the rod 10 from moving downwardly too suddenly and jarring the attachment by coming in forcible contact with the lower ends of the slots provided in the bars 12. A shaft 16 is journaled for rotation at the outer or free ends of the arms 8 and 9 and the said shaft in the vicinity of its ends carries spiders 17. The peripheries of the spiders 17 are connected together by hollow spaced bars 18 upon which are mounted soil engaging blades 19. A bevel pinion 20 is fixed to the rear end of the shaft 16, and a shaft 21 is journaled in arms 22 which are suitably supported from the plow beam or parts of the structure of the attachment, and the said shaft 21 at its rear end carries a beveled pinion 23 which meshes with the pinion 20.

The soil pulverizing member of which the parts 17, 18 and 19 are components is located just one side of the moldboard 4 of the plow bottom 3 and is adapted to operate upon the upturned side of the furrow slice as the said slice is being turned by the said moldboard. A gear wheel 24 is fixed to the spokes of the landside wheel 2 by means of clamps 25, and the shaft 21 is provided with a pinion 26 which meshes with the gear wheel 24. Therefore it will be seen that as the plow bottom 3 is turning a furrow slice, the landside wheel is rotating and rotary movement is transmitted through the intermeshing gear wheel 24 and pinion 25 to the shaft 21. From the shaft 21 this movement is transmitted through the intermeshing pinions 20 and 23 to the shaft 16 which in turn rotates the bars 18 and soil engaging members 19 about its axis. As the said members 19 come in contact with the upturned side of the furrow slice the said slice is effectually pulverized at the time that it is being turned, which leaves the soil in good condition for subsequent rolling preparatory to planting.

Having thus described the invention, what is claimed as new is:—

1. A pulverizer attachment for a plow including a beam and landside wheel, comprising a bar adapted to be applied to the plow beam, arms pivotally mounted upon the bar, means adapted to be carried by the plow beam for limiting the downward movement of the arms, resilient means for holding the arms in lowermost position, a soil engaging member journaled upon the arms, and means for rotating the said soil engaging member from the landside wheel of the plow.

2. A pulverizer attachment for a plow including a beam and landside wheel, comprising a bar adapted to be applied to the plow beam, arms pivotally mounted upon the bar and rigidly connected together, means adapted to be carried by the plow beam for limiting the downward swinging movement of the arms, resilient means for holding the arms in lowermost positions, a soil engaging member journaled for rotation between the arms, and means for rotating said member from the landside wheel of the plow.

3. A pulverizer attachment for a plow including a beam and landside wheel, comprising a bar adapted to be applied to the plow beam, arms pivoted to the bar, means rigidly connecting the arms together, brackets adapted to be applied to the plow beam, bars adjustably mounted in the brackets and having slots which receive the connecting means between the pivoted arms and which limit the downward swinging movement of the arms, resilient means for holding the arms in lowermost positions, a soil engaging member journaled between the arms, and means for rotating the soil engaging member from the landside wheel of the plow.

4. A pulverizer attachment for a plow including a beam and landside wheel, comprising a bar adapted to be applied to the plow beam, arms pivoted to the bar, means for limiting the downward swinging movement of the arms, resilient means for holding the arms in lowermost positions, a shaft journaled in the arms, means for rotating the shaft from the landside wheel of the plow, spiders mounted upon the shaft, spaced bars connecting said spiders together, and soil engaging members mounted upon the said spaced bars.

In testimony whereof, I affix my signature in presence of two witnesses.

EUGENE R. EAGAN. [L. S.]

Witnesses:
EMIL RUHNKE,
THOMAS MOSSMAN.

---

Copies of this patent may be obtained for five cents each, by addressing the "Commissioner of Patents, Washington, D. C."